(12) United States Patent
Diephuis et al.

(10) Patent No.: US 12,531,204 B2
(45) Date of Patent: Jan. 20, 2026

(54) MICROSCOPE ABERRATION CORRECTION

(71) Applicant: FEI Company, Hillsboro, OR (US)

(72) Inventors: Maurits Diephuis, Hillsboro, OR (US); Maurice Peemen, Hillsboro, OR (US); Hans Irma Stefaan Vanrompay, Hillsboro, OR (US); Narges Javaheri, Hillsboro, OR (US)

(73) Assignee: FEI Company, Hillsboro, OR (US)

( * ) Notice: Subject to any disclaimer, the term of this patent is extended or adjusted under 35 U.S.C. 154(b) by 392 days.

(21) Appl. No.: 18/345,675

(22) Filed: Jun. 30, 2023

(65) Prior Publication Data
US 2025/0006457 A1    Jan. 2, 2025

(51) Int. Cl.
*H01J 37/26* (2006.01)

(52) U.S. Cl.
CPC ..... *H01J 37/265* (2013.01); *H01J 2237/1534* (2013.01)

(58) Field of Classification Search
CPC ............ H01J 37/00; H01J 37/02; H01J 37/26; H01J 37/28; H01J 37/265; H01J 37/21; H01J 37/153; H01J 37/261; H01J 2237/1534; H01J 2237/216; H01J 2237/2802; G01M 11/02; G01M 11/0257; G01M 11/0292
USPC ......................................... 250/306, 307, 311
See application file for complete search history.

(56) References Cited

U.S. PATENT DOCUMENTS

| | | |
|---|---|---|
| 2022/0101276 A1 | 3/2022 | Banatao et al. |
| 2023/0026970 A1* | 1/2023 | Aibara ................... H01J 37/222 |
| 2024/0193399 A1* | 6/2024 | Chen ......................... G06N 3/08 |

OTHER PUBLICATIONS

Liu et al., "Masked Autoencoding for Scalable and Generalizable Decision Making," arXiv:2211.12740, Nov. 23, 2022.

(Continued)

*Primary Examiner* — Jason L Mccormack
(74) *Attorney, Agent, or Firm* — Leron Vandsburger

(57) ABSTRACT

Disclosed herein are scientific-instrument support systems, as well as related methods, apparatus, computing devices, and computer-readable media. In some embodiments, a support apparatus for a scientific instrument includes an interface device and a processing device. The interface device receives Ronchigrams acquired with the scientific instrument and transmits control signals for the electron-beam optics thereof. The processing device converts a measured Ronchigram into an input token for a transformer, produces an output token based on a tokenized sentence ending with the input token, and determines adjustments to the control signals based on the input and output tokens. The input and output tokens belong to a plurality of tokens representing reference Ronchigrams sampling an alignment parameter space of the electron-beam optics. The transformer implements an autoregressive masked language model trained on a corpus of reference sentences representing paths through the alignment parameter space to a target alignment state of the electron-beam optics.

20 Claims, 15 Drawing Sheets

(56) References Cited

OTHER PUBLICATIONS

Sagawa et al., "Aberration Measurement and Correction in Scanning Transmission Electron Microscopy using Machine Learning," Microsc. Microanal., 2021, 27(Suppl 1): 814-816.
Schnitzer et al., ""Optimal STEM Convergence Angle Selection usinga Convolutional Neural Network and the Strehl Ratio,"" Microscopy and Microanalysis, 2020, (8 pages).
Van der Hoeven et al., "Alignment Control of STEM a Ronchigram Based Approach," Microscopy and Microanalysis, 2009, 15(Suppl 2): 118-119.

* cited by examiner

MICROSCOPE ABERRATION CORRECTION

TECHNICAL FIELD

Various example embodiments relate generally, but not exclusively, to electron microscopy components, instruments, systems, and methods.

SUMMARY

The resolution of an electron microscope may be limited by imperfections of electron-beam lenses. The results of such imperfections are referred to as aberrations due to their similarity to aberrations observed in optical microscopes. For example, prior to an experimental measurement with a scanning transmission electron microscope (STEM), an operator typically needs to tune the microscope's electron-beam lenses such that at least some aberrations are corrected. In some cases, such tuning needs to be repeated, e.g., several times a day, to offset a detuning caused by various drifting processes in the circuitry associated with the electron-beam lenses. When performed manually by the operator, the tuning of this type is typically tedious, time-consuming, and/or nonoptimal.

Disclosed herein are, among other things, various examples, aspects, features, and embodiments of a scientific instrument including an electron microscope column and associated Ronchigram acquisition circuitry. An electronic controller of the scientific instrument employs a transformer to automatically correct at least some geometric aberrations of the electron-beam optics in the electron microscope column. According to an example embodiment, the transformer implements an autoregressive masked language model trained on a corpus of reference sentences representing various paths, through an alignment parameter space of the electron-beam optics, to a target alignment state thereof. The return loop of the transformer is connected to the Ronchigram acquisition circuitry to enable the transformer to automatically drive the alignment process of the scientific instrument toward the target alignment state based on concurrently acquired Ronchigrams, thereby beneficially obviating the need for manual (re)alignment of the electron-beam optics by the operator.

One example provides a support apparatus for a scientific instrument, the support apparatus comprising: an interface device configured to receive data representing Ronchigrams acquired with an electron microscope column of the scientific instrument and further configured to transmit one or more control signals for electron-beam optics of the electron microscope column; and a processing device configured to: convert a measured Ronchigram into an input token for a transformer; produce, with the transformer, an output token based on a tokenized sentence ending with the input token; and determine one or more adjustments to the one or more control signals based on the input token and the output token, wherein the input token and the output token belong to a plurality of tokens representing a plurality of reference Ronchigrams sampling an alignment parameter space of the electron-beam optics; and wherein the transformer implements an autoregressive masked language model trained on a corpus of reference sentences, each of the reference sentences representing a respective path through the alignment parameter space to a target alignment state of the electron-beam optics.

Another example provides an automated method performed via a computing device for providing support to a scientific instrument, the method comprising: converting a measured Ronchigram into an input token for a transformer, the measured Ronchigram being received via data acquired with an electron microscope column of the scientific instrument; producing, with the transformer, an output token based on a tokenized sentence ending with the input token; and determining, based on the input token and the output token, one or more adjustments to one or more control signals for electron-beam optics of the electron microscope column; wherein the input token and the output token belong to a plurality of tokens representing a plurality of reference Ronchigrams sampling an alignment parameter space of the electron-beam optics; and wherein the transformer implements an autoregressive masked language model trained on a corpus of reference sentences, each of the reference sentences representing a respective path through the alignment parameter space to a target alignment state of the electron-beam optics.

Yet another example provides a non-transitory computer-readable medium storing instructions that, when executed by a computing device, cause the computing device to perform operations comprising the above automated method.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings.

DETAILED DESCRIPTION

Figure 1:
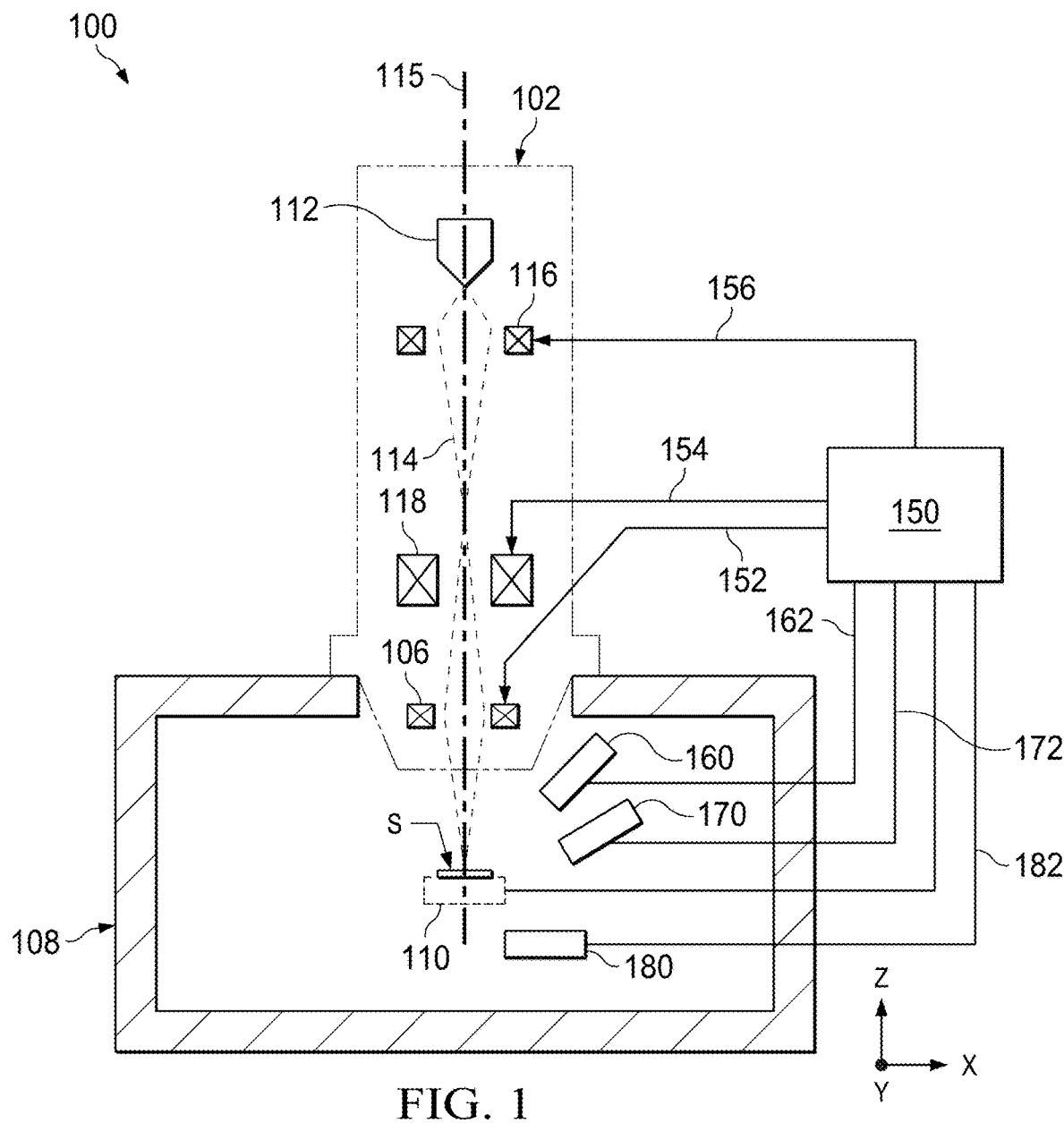
FIG. 1 is a block diagram illustrating an example scientific instrument in accordance with some embodiments.

An example STEM alignment method includes two or more sets of alignment operations. One set of such alignment operations, sometimes referred to as Ronchigram alignment, involves tuning of the electron-beam optics based on observed Ronchigram patterns. Using Ronchigram alignment, both lower order and higher order aberrations can be corrected. In some implementations, after the Ronchigram alignment, a condenser lens aperture is inserted and then at least some residual aberrations are finely corrected to obtain a high-quality STEM image. Disadvantageously, at least some users find it difficult to perform the Ronchigram alignment.

Herein, the term "Ronchigram" refers to the diffraction pattern of a convergent electron beam focused on an amorphous specimen. In mathematical terms, a lens aberration function, $\chi(k)$, can be represented by Eq. (1):

$$\chi(\alpha, \phi) = \frac{2\pi}{\lambda} \sum_{n,m} \frac{C_{n,m} \alpha^{n+1} \cos(m(\phi - \phi_{n,m}))}{n+1} \quad (1)$$

where $\alpha$ is the convergence angle; $\phi$ is the azimuthal angle; $\lambda$ is the wavelength of the electron beam; $C_{n,m}$ and $\phi_{n,m}$ denote different components of geometric aberration in the Krivanek notation; m is the degree of the aberration; and n is the order of the aberration. The observed Ronchigram is proportional to the electron probability density g(k) on the diffraction plane, which can be expressed using the square of the modulus of the Fourier transform (FT) of the transmitted wavefunction $\psi_t(x)$, e.g., as follows:

$$g(k) = |FT\{\psi_t(x)\}|^2 \quad (2)$$

where the transmitted wavefunction $\psi_t(x)$ is a product of the Fourier transform of the aberration function $\chi(k)$ and an amorphous specimen potential. In some models, an amorphous specimen is treated as a randomly generated noisy phase grating that adds random phases to the electron beam, e.g., under the Eikonal approximation.

Important features encoded in the texture of a Ronchigram are magnification and symmetry. For an in-focus beam, the center of a Ronchigram has high local magnification that represents a coherent, substantially aberration-free portion of the electron beam. Further away from the optical axis, aberrations reduce the local magnification. The presence of aberrations affects the structure and symmetry of the Ronchigram. For example, asymmetric aberrations (m>0) break rotational symmetry. Two-fold astigmatism ($C_{12}$) typically unidirectionally stretches the region of high magnification and produces distinct streaking. Axial coma ($C_{21}$) shifts the center of the Ronchigram. Three-fold astigmatism ($C_{23}$) produces three-fold symmetric lobes, and so on. When the microscope is being aligned, various currents through the electron-beam lenses can be adjusted to minimize various manifestations of aberrations in the Ronchigrams. In a well-aligned microscope, lower-order aberrations are nearly completely corrected, resulting in a large featureless region of high local magnification, often having a characteristic six-fold outline attributable to residual higher-order aberrations.

FIG. 1 is a block diagram illustrating a scientific instrument 100 in accordance with some embodiments. The scientific instrument 100 includes a scanning transmission electron microscope (STEM) column 102 coupled to a vacuum chamber 108. The vacuum chamber 108 houses therein a movable sample holder 110 and can be evacuated using one or more vacuum pumps (not explicitly shown in FIG. 1). In an example embodiment, the sample holder 110 is independently movable parallel to the XY-coordinate plane and parallel to the Z-coordinate axis, with the corresponding coordinate system being indicated by the XYZ-coordinate triad shown in FIG. 1. A sample S to be interrogated using the scientific instrument 100 is mounted in the sample holder 110 as indicated in FIG. 1.

In the example shown, the STEM column 102 comprises an electron source 112 and two or more electron-beam lenses, only two of which, i.e., an objective lens 106 and a condenser lens 116, are schematically shown in FIG. 1 for illustration purposes. In some examples, a different (from two) number of such lenses may be used in the STEM column 102. In some embodiments, the objective lens 106 can be an ultra-high-resolution (UHR) lens.

In operation, the electron source 112 generates an electron beam 114 propagating generally along a longitudinal axis 115 of the STEM column 102. Electron-beam lenses 106 and 116 are operated to generate electric and magnetic fields that affect electron trajectories in the electron beam 114. Control signals 152, 156 generated by an electronic controller 150 are used to change the strengths and/or spatial configurations of the fields and impart desired properties on the electron beam 114. In general, the electron-beam lenses 106 and 116, control signals 152 and 156, and other pertinent components of the scientific instrument 100 can be used to perform various operations and support various functions, such as beam focusing, aberration mitigation, aperture cropping, filtering, etc. The STEM column 102 further comprises a deflection unit 118 that can steer the electron beam 114 in response to a control signal 154 applied thereto by the electronic controller 150. Such beam steering can be used to move a focused portion of the electron beam 114 along a desired path across the sample S, e.g., to perform a raster or vector scan thereof.

The scientific instrument 100 also includes detectors 160, 170, 180 located in the vacuum chamber 108 in relatively close proximity to the sample S. In operation, the detectors 160, 170, and 180 generate streams of measurements 162, 172, and 182, which are received by the electronic controller 150. Specific types of the detectors 160, 170, 180 depend on the embodiment of the scientific instrument 100 and can typically be chosen from a variety of detector types suitable for detecting different types of emission and/or radiation from the sample S produced thereby in response to the electron beam 114. Example types of the emission/radiation that can be produced in this manner include, but are not limited to, X-rays, infrared light, visible light, ultraviolet light, back-scattered electrons, secondary electrons, Auger electrons, elastically scattered electrons, non-scattered (e.g., zero energy loss) electrons, and non-elastically scattered electrons. In various embodiments, a different (from three) number of such detectors can be used in the scientific instrument 100. In some embodiments, the detectors 160, 170, 180 are selected from the group consisting of a high-angle annular dark field detector, a medium-angle annular dark field detector, an annular bright field detector, a segmented annular detector, a differential phase contrast detector, and a two-dimensional (e.g., pixelated) diffraction-pattern detector. Other detectors capable of detecting various ones of the above-mentioned types of emission/radiation can also be used in various additional embodiments.

Figure 2:
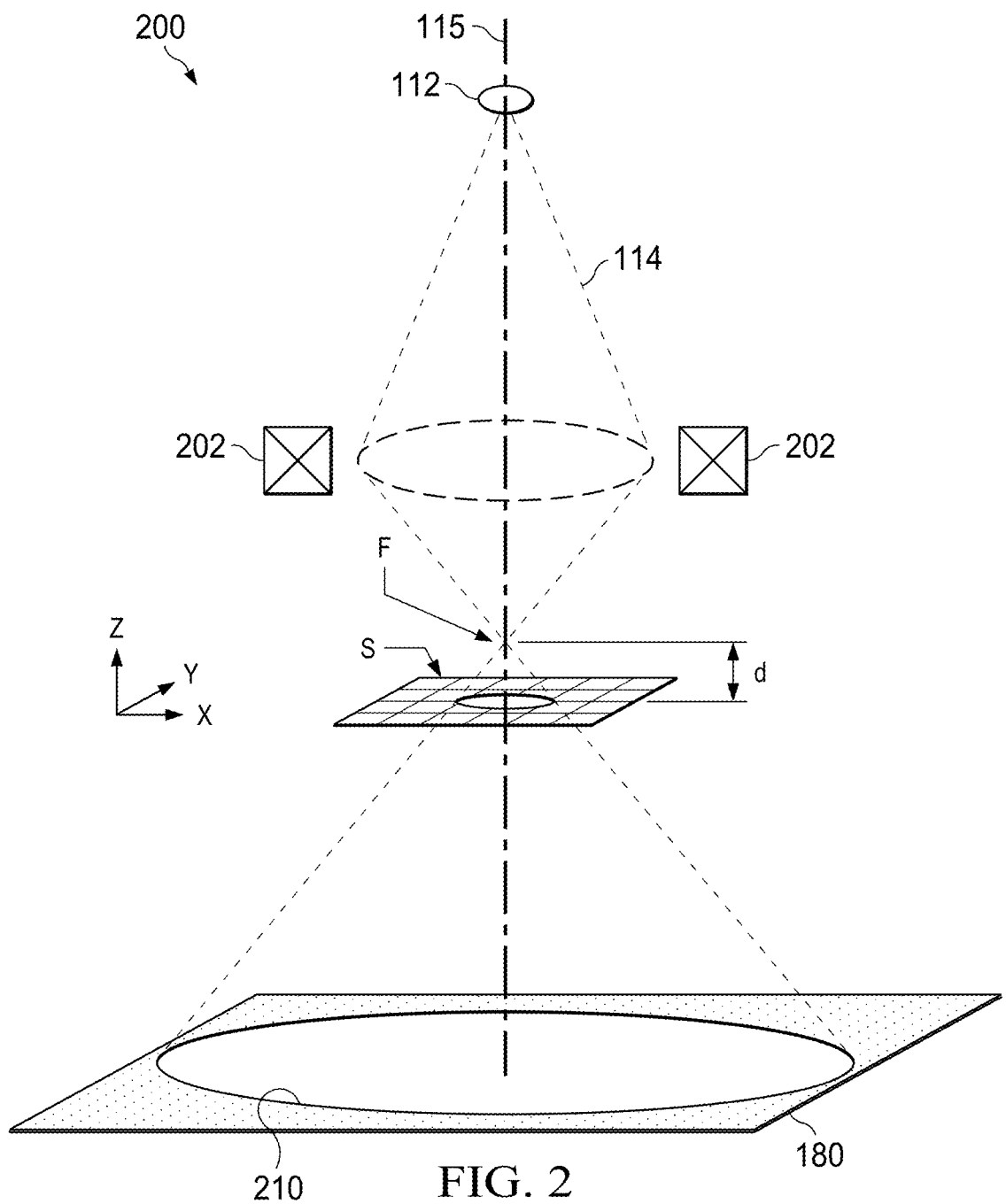
FIG. 2 is a block diagram illustrating acquisition of a Ronchigram in the scientific instrument of FIG. 1 in accordance with some embodiments.

FIG. 2 is a block diagram 200 illustrating acquisition of a Ronchigram image 210 in the scientific instrument 100 in accordance with some embodiments. For simplicity, only one probe-forming lens, i.e., an electron-beam lens 202 is shown in FIG. 2. The electron-beam lens 202 represents the objective lens pre-field, which may in practice be implemented with more than one electron-beam lens (e.g., see the electron-beam lenses 106, 116, FIG. 1). Compression of the electron beam 114 caused by the objective lens post-field and the effects of any post specimen lenses are not explicitly shown in FIG. 2. The Ronchigram image 210 is captured by a two-dimensional pixelated detector (e.g., a CCD camera) 180.

In some implementations, prior to the Ronchigram acquisition, the sample S and/or the electron beam 114 are positioned such that the electron beam 114 hits the sample S in an amorphous region thereof. In some other implementations, a crystalline region of the sample S can also be used. During acquisition of the Ronchigram image 210, the electron beam 114 remains stationary, and the post-specimen intensity of the beam is recorded by the CCD camera 180 or by a functionally equivalent device. To perform the above-mentioned Ronchigram alignment, a series of Ronchigram images 210 is acquired, with each of the Ronchigram images 210 in the series being captured after a small change in the electrical excitation of a selected component of the probe-forming lens 202.

The above-described Ronchigram series can be used to guide the STEM alignment because the intensity of the electron beam 114, formed at the STEM's Fraunhofer diffraction plane, varies considerably with angle, and this variation is a sensitive function of the lens aberrations and defocus d. When the excitation of an optical component of the probe-forming lens 202 is slightly changed, small misalignments become apparent by translations in the Ronchigram pattern that depart from circular symmetry. Furthermore, the presence or absence of interference fringes in the Ronchigram pattern correlates with the amount of incoherent broadening.

At a large defocus d, the electron rays' cross-over point F is at a relatively large distance from the sample S, along the longitudinal axis 115, and a projection image may be observed with the detector 180. As Gaussian focus is approached, an angular dependence to the magnification typically emerges, e.g., due to the lens aberrations and the manner in which the lens aberrations affect the phase of the electron beam 114. At slight underfocus (i.e., when the cross-over point F is slightly below the sample S), azimuthal and radial circles of virtually infinite magnification may be observed. These are the angles at which defocus d and the spherical aberration effectively cancel each other. Axial astigmatism can be accurately corrected, e.g., by exciting stigmator coils in the STEM column 102, to cause those Ronchigram features to be approximately circularly symmetric. As the electron beam 114 is better focused on the sample S, the central, low angles display progressively higher magnification. The coma free axis is clearly defined in the Ronchigram in this position, and all alignment and positioning of detectors and apertures can beneficially be performed with respect to that axial spot. Direct observability of the coma-free axis in the series of Ronchigram images 210 is a significant advantage of Ronchigram alignment over some other alignment methods, in which, e.g., the current or voltage center of the objective lens is used as a proxy reference, and this type of reference is typically not as accurate as the directly visible one.

After the electron beam 114 is aligned with respect to the coma-free axis, control of the beam's intensity distribution is dependent on the exact settings of the electron-beam lens 202 and the size of the STEM objective aperture, which is typically inserted to exclude peripheral aberrated beams corresponding to high angles. For example, lower order aberrations can now be corrected, based on the manifestations thereof in the Ronchigram images 210 captured by the detector 180, e.g., by "turning" the A1 and C1 virtual knobs of the scientific instrument 100. Herein, the term "A1 virtual knob" refers to one or more settings of the electron-beam lens 202 that mainly affect the two-fold astigmatism ($C_{12}$) component of the lens aberration function $\chi(k)$. The term "C1 virtual knob" refers to one or more settings of the electron-beam lens 202 that mainly affect the defocus d. The A1 and C1 virtual knobs are typically turned in small increments to navigate from a detuned lens configuration to a configuration in which the pertinent lower order aberrations are substantially corrected. A series of the Ronchigram images 210 is typically needed to guide this navigation process due to inherent ambiguities in the inference of the actual A1 and C1 values from a single Ronchigram image 210, e.g., as explained below in reference to FIG. 3A. These inherent ambiguities are manifestations of the corresponding symmetries in the lens aberration function $\chi(k)$ (also see Eq. (1)). Various embodiments disclosed herein are directed at automating the navigation process through the alignment parameter space of the electron-beam optics, e.g., as described in more detail below.

Figure 3A:
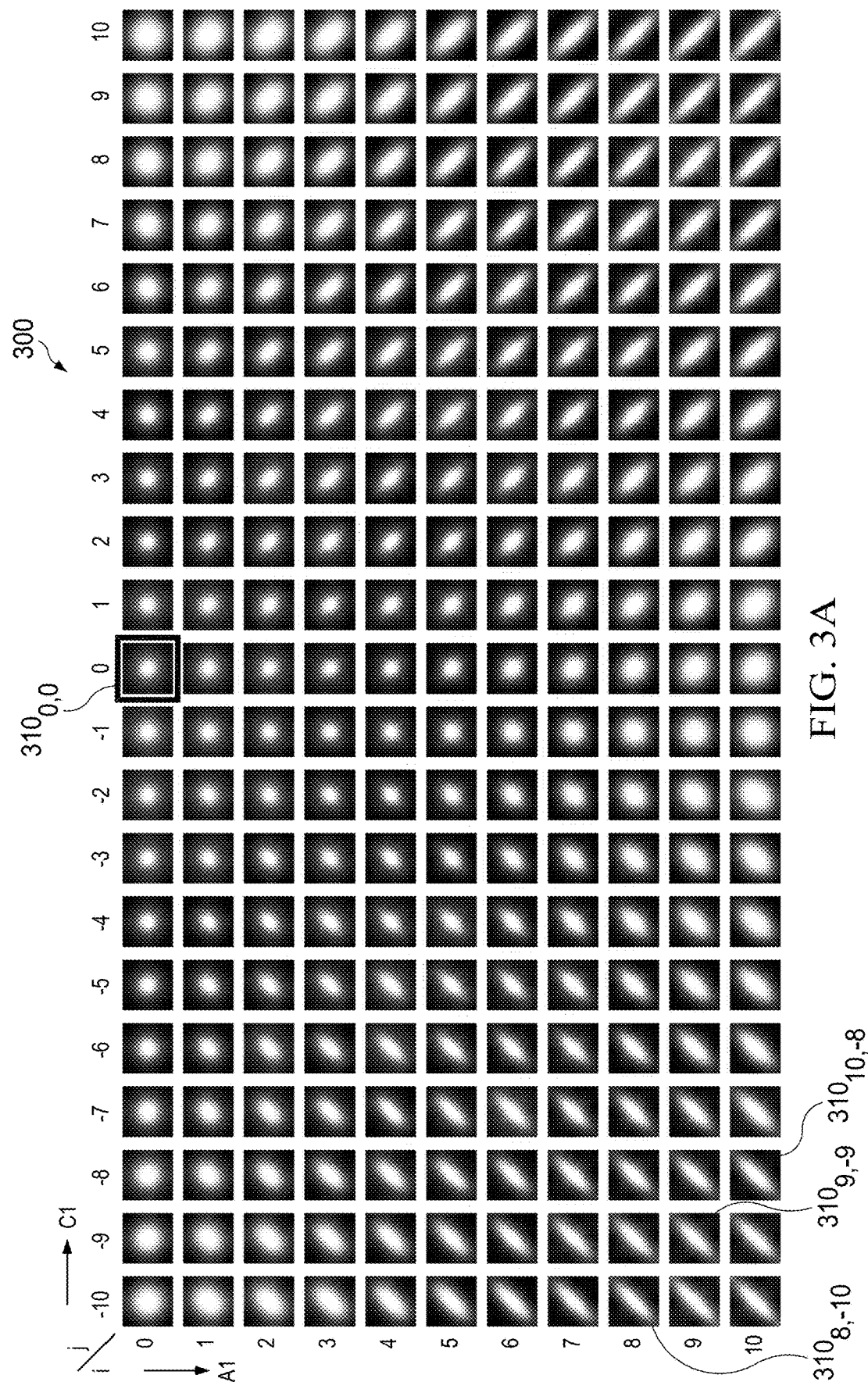
FIGS. 3A-3C are Ronchigram charts corresponding to a two-dimensional (2D) alignment parameter space of the scientific instrument 100 according to some examples.

FIG. 3A is a Ronchigram chart 300 corresponding to an A1-C1 parameter space of the scientific instrument 100 according to one example. The Ronchigram chart 300 has a respective reference Ronchigram $310_{ij}$ for each (A1, C1) value pair including the i-th value of the A1 parameter and the j-th value of the C1 parameter, where i and j are indices. Each Ronchigram $310_{ij}$ is a reciprocal space (k-space) Ronchigram, which is related to the corresponding x-space Ronchigram image 210 captured by the detector 180 via a Fourier transform.

In the chart 300, the Ronchigram $310_{00}$ corresponds to a target alignment state of the scientific instrument 100, wherein the pertinent lower order aberrations are substantially corrected. Inherent ambiguities in the inference of the actual A1 and C1 parameter values from a single Ronchigram $310_{ij}$ are evident, e.g., from comparison of Ronchigrams $310_{8,-10}$, $310_{10,-8}$, and $310_{9,-9}$ in the chart 300. These individual Ronchigrams are very similar to one another even though each of them corresponds to a different respective (A1, C1) value pair. Thus, upon acquiring a single Ronchigram that looks like any of the Ronchigrams $310_{8,-10}$, $310_{10,-8}$, and $310_{9,-9}$, unambiguous inference of the corresponding actual (A1, C1) parameter value pair is difficult. However, without knowing the instrument's present location in the A1-C1 parameter space, even the signs of the needed A1 and/or C1 parameter adjustments may not be unambiguously determinable in some cases.

Various embodiments disclosed herein address at least some of the above-indicated problems in the state of the art using machine learning techniques. In a representative example, a deep learning architecture is provided to guide the instrument-alignment process through the alignment parameter space (exemplified by the chart 300, FIG. 3A) by construing the Ronchigram-alignment paths through the alignment parameter space of the scientific instrument 100 as sentences of an "alignment" language. Words of this alignment language are represented by Ronchigrams, and grammatically correct sentences of this alignment language are represented by Ronchigram sequences that lead to the target alignment state of the scientific instrument 100, such as the state corresponding to the Ronchigram $310_{00}$ in the chart 300. In some examples, the deep learning architecture relies on: (i) a digital twin of the scientific instrument 100 capable of generating reference Ronchigrams for a plurality of known alignment parameter space settings; (ii) training an AI agent to tune the digital twin toward the target alignment state; and (iii) deployment of the trained AI agent with the electronic controller 150 of the scientific instrument 100 for automated control of the Ronchigram alignment process.

Herein, the term "digital twin" refers to a computer model of the scientific instrument 100 configured to output a computed Ronchigram in response to an input of any valid set of alignment parameter values. For the example illustrated in FIG. 3A, the digital twin operates to compute a respective Ronchigram $310_{ij}$ in response to receiving, as input, a valid (A1, C1) parameter value pair consisting of the i-th value of the A1 parameter and the j-th value of the C1 parameter. For different embodiments of the STEM column tuning circuitry, the digital twin of the scientific instrument 100 can be configured to compute Ronchigrams for other virtual knob combinations, e.g., combinations that control alignment parameters other than the A1 and/or C1 parameters and/or having a different (from two) number of virtual knobs in the knob combination used for tuning the STEM column.

Figure 3B:
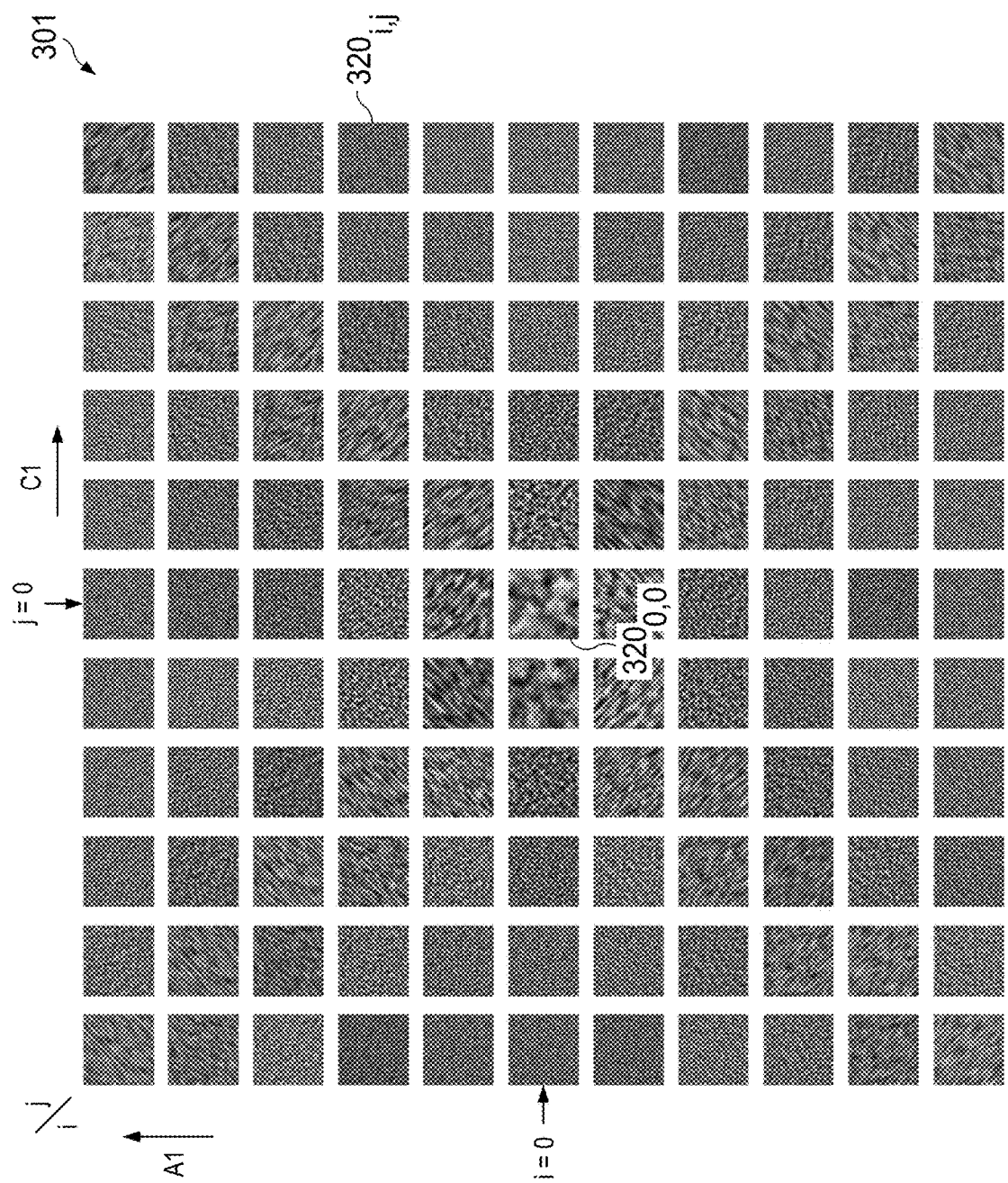
Figure 3C:
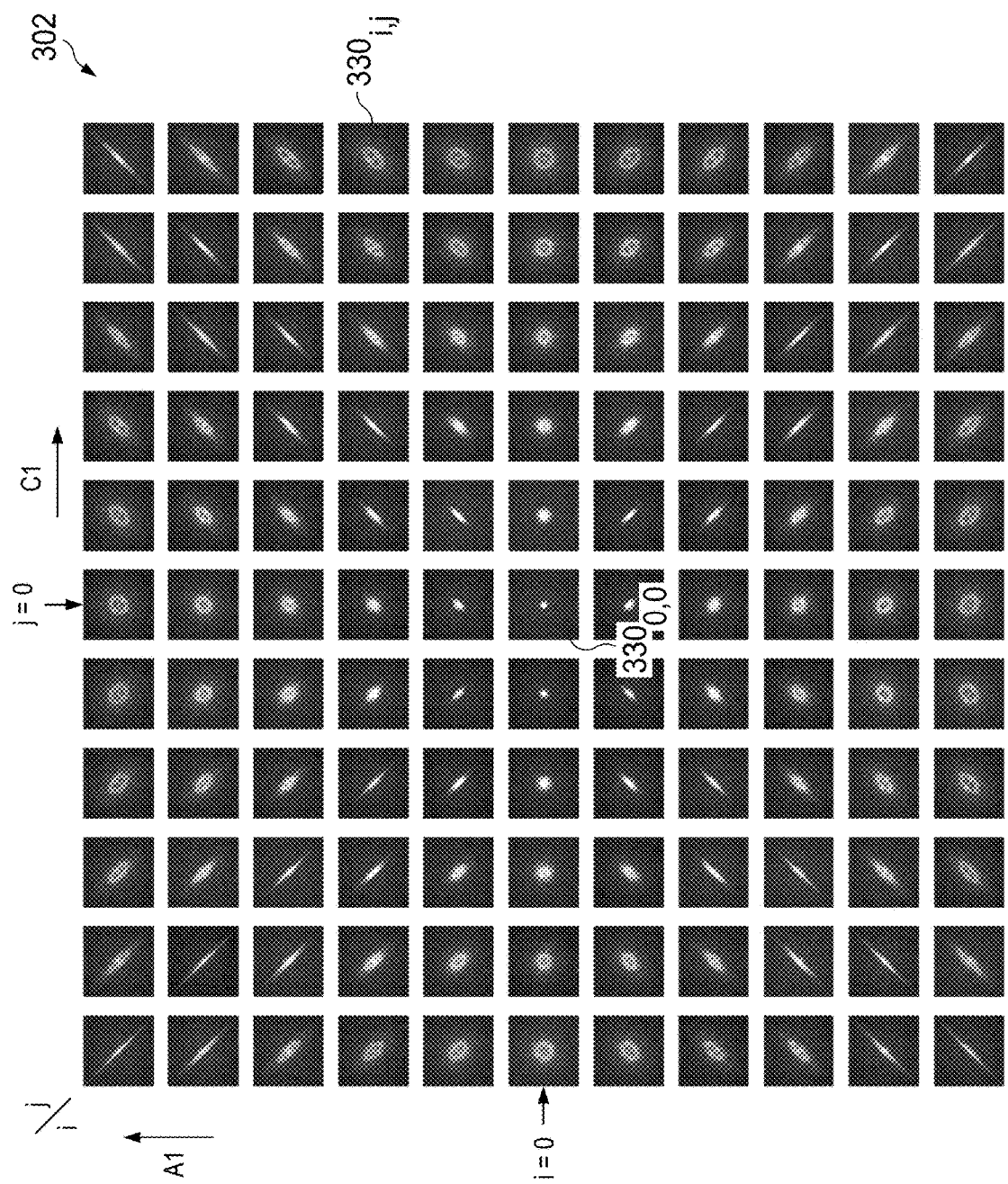
Figure 4A:
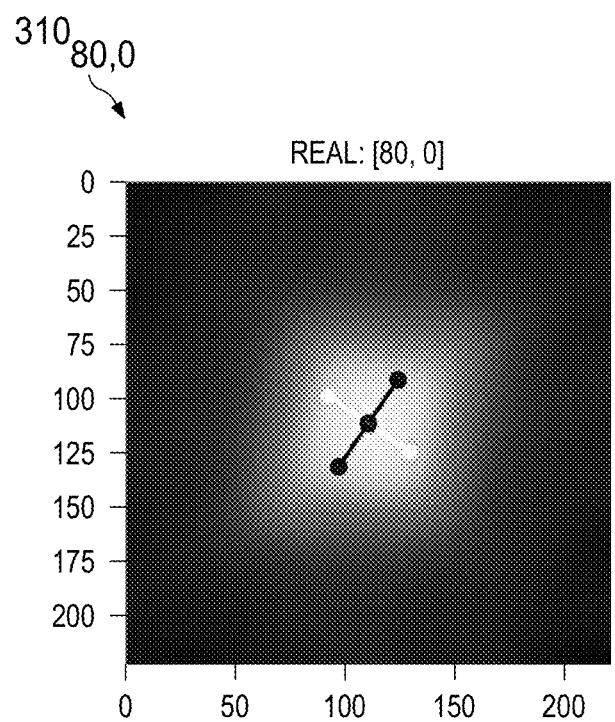
FIGS. 4A-4H pictorially illustrate generative performance of a digital twin of the scientific instrument of FIG. 1 according to some examples.
Figure 4B:
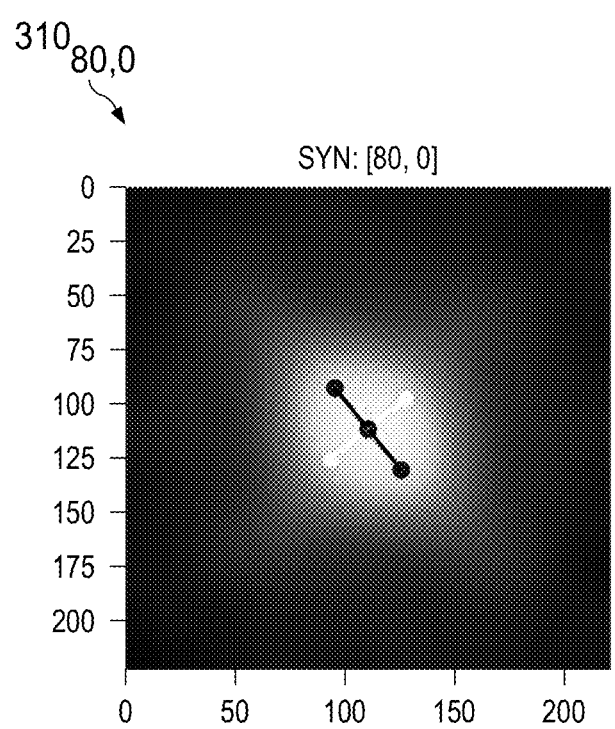
Figure 4C:
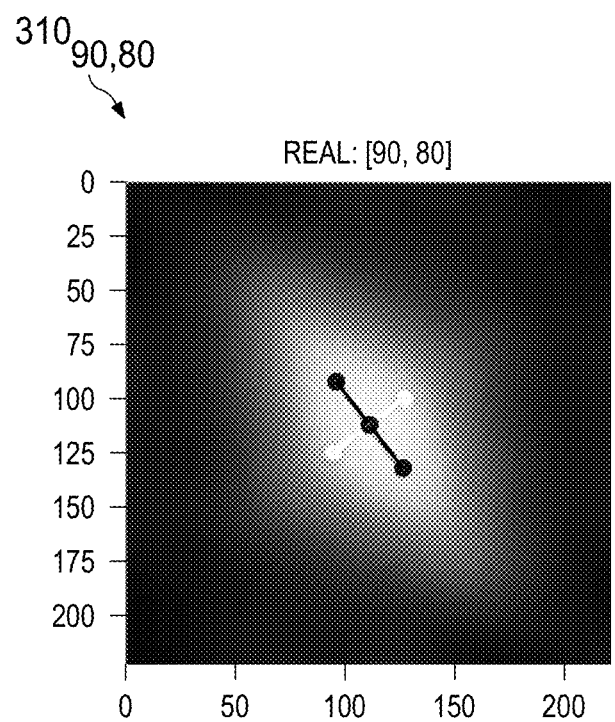
Figure 4D:
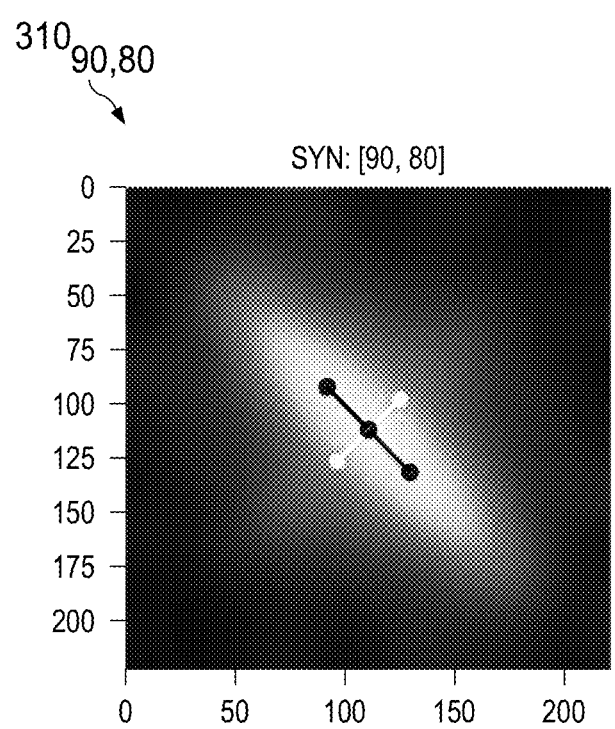
Figure 4E:
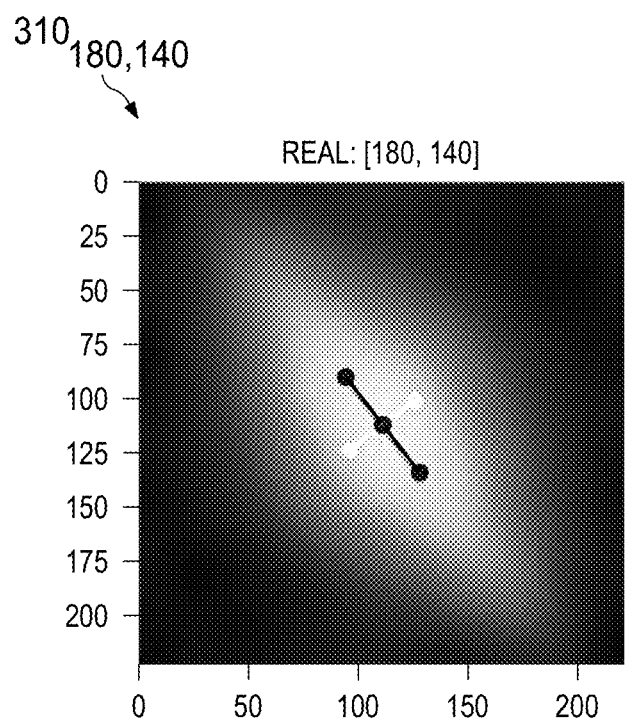
Figure 4F:
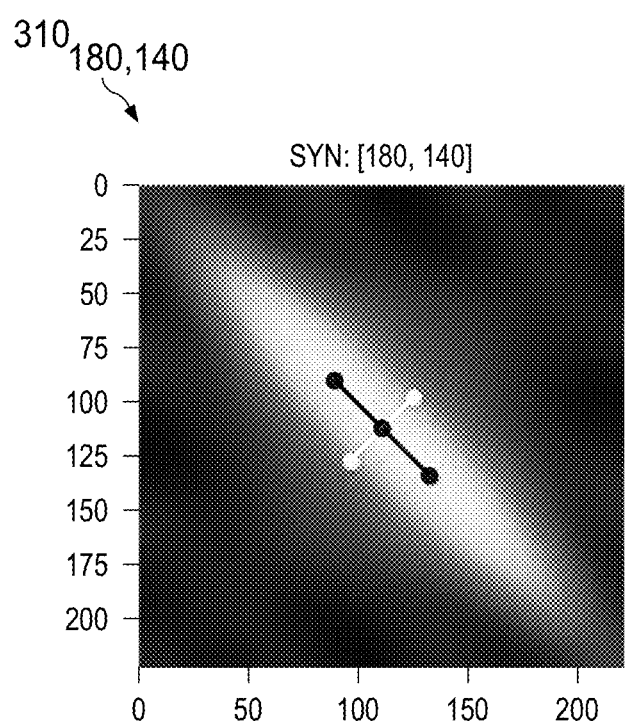
Figure 4G:
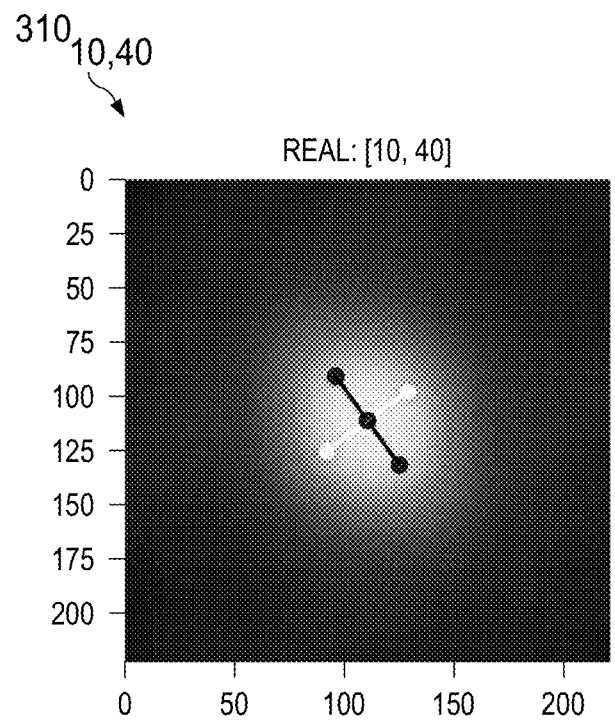
Figure 4H:
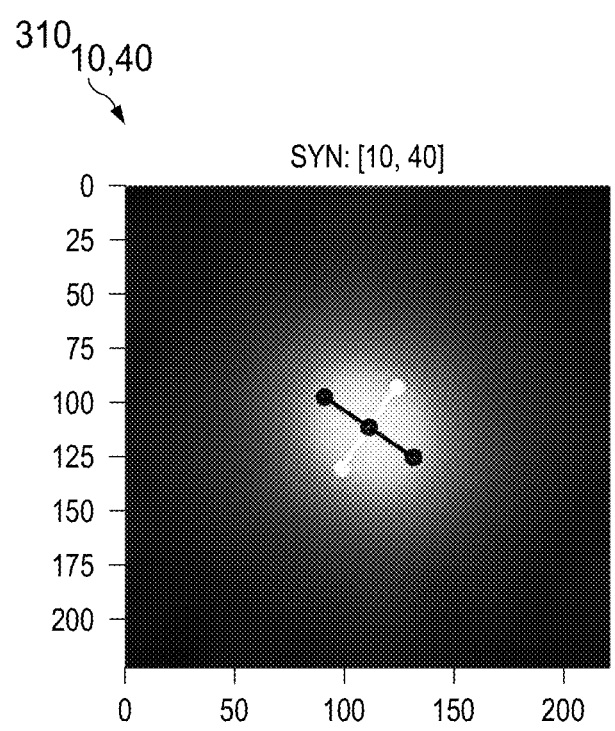

FIGS. 3B-3C show Ronchigram charts 301 and 302, respectively, corresponding to the A1-C1 parameter space of the scientific instrument 100 according to another example. Both of the Ronchigram charts 301 and 302 are generated using a digital twin of the scientific instrument 100. The Ronchigram chart 301 (FIG. 3B) has Ronchigram images $320_{ij}$, each of which is analogous to the Ronchigram image 210. The Ronchigram chart 302 (FIG. 3C) has reciprocal space (k-space) Ronchigrams $330_{ij}$, each of which is computed by Fourier-transforming the corresponding one of the Ronchigram images $320_{ij}$ shown in FIG. 3B. In each of the Ronchigram charts 301 and 302, the horizontal axis represents the C1 parameter, and the vertical axis represents the A1 parameter. The Ronchigram image $320_{00}$ and the reciprocal space Ronchigram $330_{00}$ represent the target alignment state of the scientific instrument 100.

Some embodiments disclosed herein use Ronchigram images to perform the Ronchigram alignment. The Ronchigram images used in these embodiments can be the measured Ronchigram images 210 (FIG. 2) or images similar to the digital-twin Ronchigram images $320_{ij}$ (FIG. 3B). Some other embodiments disclosed herein use reciprocal space Ronchigrams to perform the Ronchigram alignment. The reciprocal space Ronchigrams used in these embodiments can be similar to the reciprocal space Ronchigrams $310_{ij}$ (FIG. 3A) or to the reciprocal space Ronchigrams $330_{ij}$ (FIG. 3C).

FIGS. 4A-4H pictorially illustrate performance of a digital twin of the scientific instrument 100 according to some examples. More specifically, each of FIGS. 4A-4H shows a respective Ronchigram $310_{ij}$ for the indicated index values. The Ronchigrams $310_{ij}$ are presented in pairs (grouped as FIGS. 4A-4B, FIGS. 4C-4D, FIGS. 4E-4F, and FIGS. 4G-4H, respectively), wherein each pair includes the corresponding experimentally measured and digital-twin Ronchigrams $310_{ij}$ for convenient comparison of the two. The experimentally measured Ronchigrams are shown in FIGS. 4A, 4C, 4E, and 4G. The corresponding digital-twin Ronchigrams are shown in FIGS. 4B, 4D, 4F, and 4H, respectively. Comparison of the Ronchigrams within each pair reveals some mismatch between the experimentally measured and digital-twin Ronchigrams $310_{ij}$, which is visually indicated by differences in the fitting of the major and minor axes for some Ronchigram pairs.

In different examples, the AI agent can be trained on experimentally measured Ronchigrams $310_{ij}$ or on digital-twin Ronchigrams $310_{ij}$. The experimentally measured Ronchigrams $310_{ij}$ may generally provide for more precise training of the AI agent than the digital-twin Ronchigrams $310_{ij}$. However, the gain in the precision comes at a cost of a significant time investment that goes into the experiments directed at measuring those Ronchigrams $310_{ij}$. On the other hand, some loss in the precision with the use of digital-twin Ronchigrams $310_{ij}$ may be offset by the speed and ease with which a relatively large number of digital-twin Ronchigrams $310_{ij}$ can be generated when a relatively accurate digital twin of the scientific instrument 100 is available. Although the presence of the mismatch illustrated in FIGS. 4A-4H may generally reduce the convergence speed toward the target state for the AI agent trained on the digital-twin Ronchigrams $310_{ij}$, such digital-twin Ronchigrams still provide sufficiently accurate approximations of the experimental Ronchigrams $310_{ij}$ for the convergence to take place. Thus, depending on the cost-benefit analyses applicable to different use cases, either experimentally measured Ronchigrams $310_{ij}$ or digital-twin Ronchigrams $310_{ij}$ may be used for training the AI agent. In some cases, the use of digital-twin Ronchigrams $310_{ij}$ may be preferred for training the AI agent.

Figure 5:
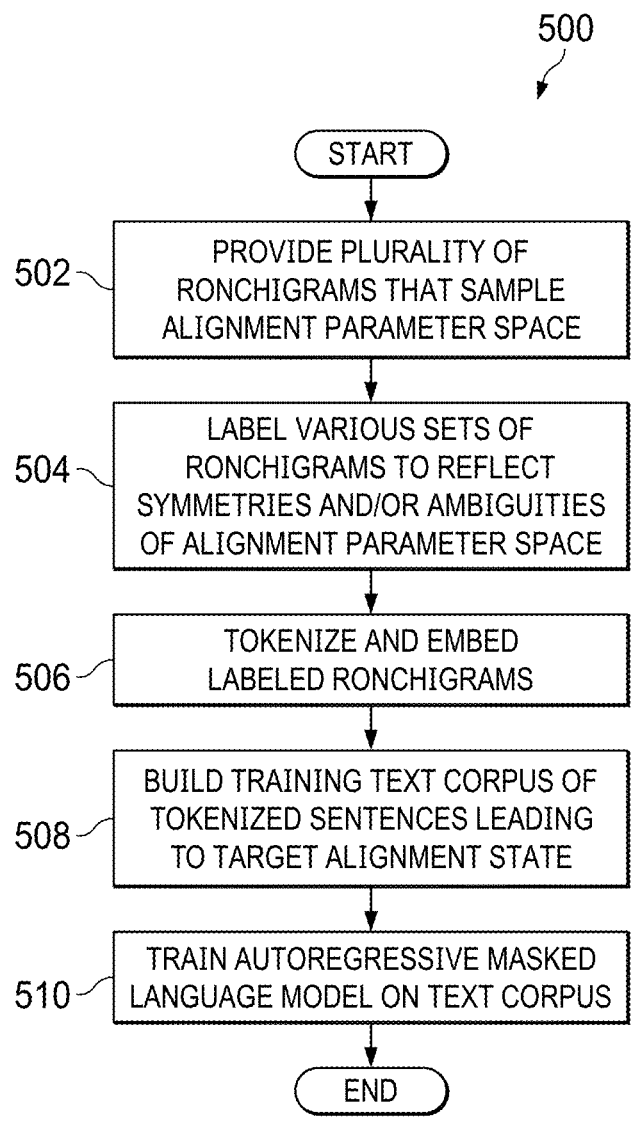
FIG. 5 is a flowchart illustrating a method of training an artificial intelligence (AI) agent to perform Ronchigram alignment in the scientific instrument of FIG. 1 according to some embodiments.

FIG. 5 is a flowchart illustrating a method 500 of training an AI agent to perform Ronchigram alignment in the scientific instrument 100 according to some embodiments. For illustration purposes and without any implied limitations, the method 500 is described in reference to the above-described example A1-C1 alignment parameter space. Based on the provided description, a person of ordinary skill in the pertinent art will be able to make and use other embodiments of the method 500 corresponding to other alignment parameter spaces.

Operations of a block 502 of the method 500 include providing a plurality of reference Ronchigrams $310_{ij}$ that sufficiently sample the alignment parameter space, such as the A1-C1 alignment parameter space (FIGS. 3A-3C). In some examples, the plurality of reference Ronchigrams $310_{ij}$ provided in the block 502 include experimentally measured Ronchigrams. In some other examples, the plurality of Ronchigrams $310_{ij}$ provided in the block 502 include digital-twin Ronchigrams. The granularity of the parameter space sampling by the reference Ronchigrams is a selectable configuration parameter of the method 500. In different examples, the sampling granularity for the A1 and C1 dimensions of the alignment parameter space can be the same or different. In some examples, the sampling granularity for a given dimension of the alignment parameter space may be nonuniform. In some of such examples, a relatively finer sampling granularity is used closer to the target state $310_{00}$ of the scientific instrument 100 while a relatively coarser sampling granularity is used farther away from the target state $310_{00}$ of the scientific instrument 100.

Operations of a block 504 of the method 500 include labeling various ones of the provided Ronchigrams $310_{ij}$ to reflect the fact that substantially similar Ronchigrams may represent different locations in the alignment parameter space. In one example, operations of the block 504 include giving a different respective label to each set of such substantially similar Ronchigrams.

Figure 6:
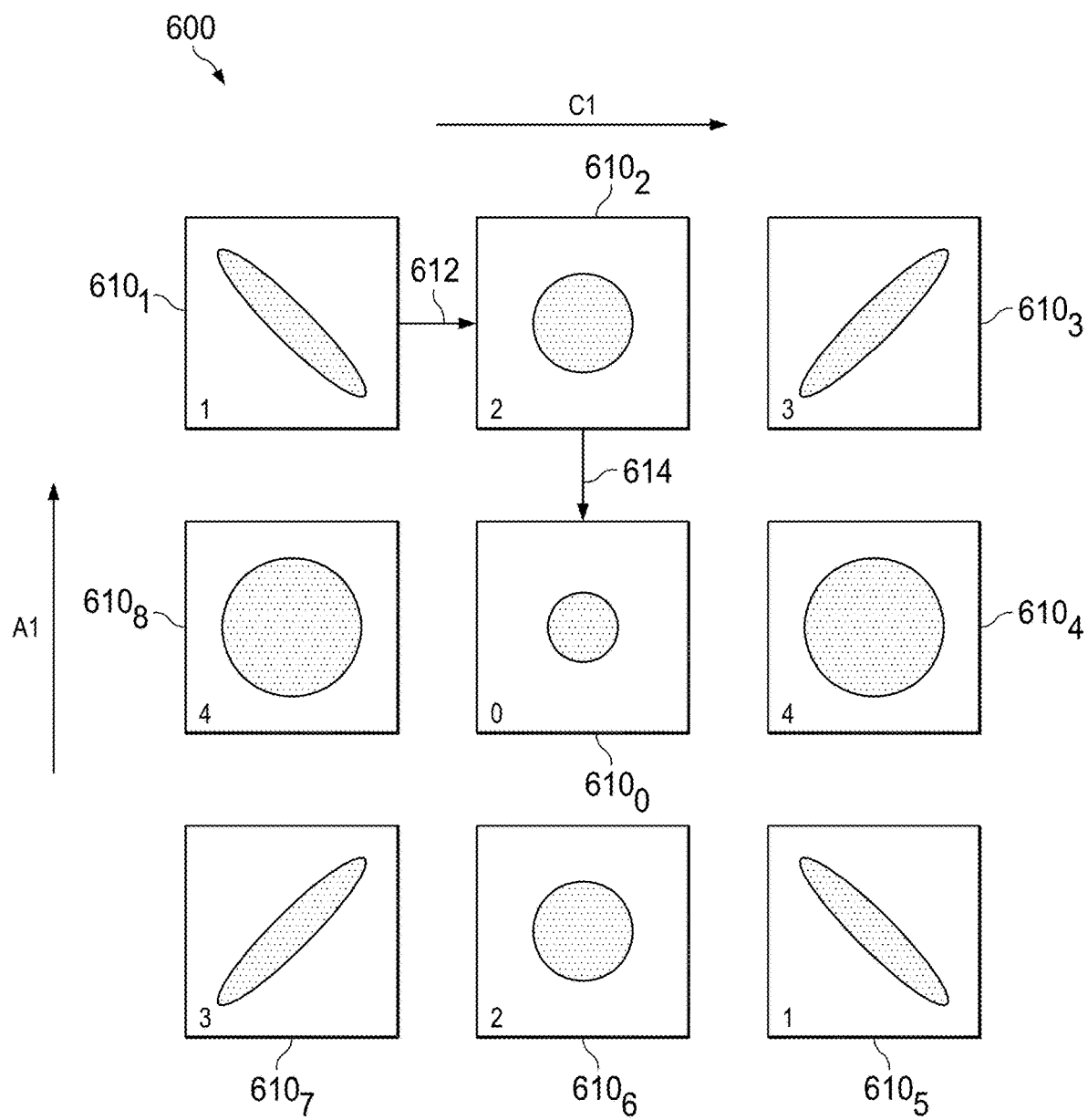
FIG. 6 is a Ronchigram chart illustrating certain operations of the method of FIG. 5 according to some examples.

FIG. 6 is a Ronchigram chart 600 illustrating labeling operations of the block 504 according to some examples of the method 500. The chart 600 is generally analogous to the chart 300 (FIG. 3A), but only includes nine reciprocal space (k-space) Ronchigrams $610_k$ (where k=0, 1, . . . , 8) for simplicity. The Ronchigram $610_0$ represents the target alignment state of the scientific instrument 100 (also see $310_{00}$, FIG. 3A) and is given the label "0" by the labeling operations of the block 504. The Ronchigrams $610_1$ and $610_5$ are substantially similar to one another and are given the label "1". The Ronchigrams $610_2$ and $610_6$ are substantially similar to one another and are given the label "2". The Ronchigrams $610_3$ and $610_7$ are substantially similar to one another and are given the label "3". The Ronchigrams $610_4$ and $610_8$ are substantially similar to one another and are given the label "4".

Operations of a block 506 of the method 500 include tokenizing and embedding the labeled Ronchigrams $310_{ij}$ produced by the labeling operations of the block 504. The resulting embeddings are vector representations of the labeled Ronchigrams $310_{ij}$. In some examples, the corresponding vectors are real-valued and are constructed to encode the "meaning" of the labeled Ronchigrams $310_{ij}$ in the alignment parameter space, with such meaning being related to a degree of alignment with respect to the target state $310_{00}$ of the scientific instrument 100. In other words, the labeled Ronchigrams $310_{ij}$ having the embeddings that are relatively close to one another in the vector space are expected to have a similar degree of alignment with respect to the target state $310_{00}$ within the chart 300. In various embodiments, operations of the block 506 can be implemented using one or more of a neural network, dimensionality reduction, probabilistic models, an explainable knowledge base method, and/or other methods typically used for these purposes in natural language processing (NLP) models. In some other examples, the embedding does not completely reflect the A/C parameters or preserve their distance in the original parameter space. In such examples, Ronchigrams are encoded in a way that reflects their FFT shape, as there will be multiple A-C combinations that lead to (substantially) the same Ronchigram. The encoder honors this symmetry and operates to relabel the corresponding Ronchigrams accordingly.

Operations of a block 508 of the method 500 include building a training text corpus by (i) generating a plurality of different alignment sequences, each of which leads to the target state $310_{00}$ or $610_0$ of the scientific instrument 100 and (ii) representing each alignment sequence with a corresponding tokenized sentence. In FIG. 6, an example alignment sequence of such training text corpus is indicated by arrows 612 and 614. The initial alignment state of this example sequence corresponds to the Ronchigram $610_1$. The arrow 612 represents the "turning" of the C1 virtual knob of the scientific instrument 100 that causes the instrument to transition from the initial alignment state into an intermediate alignment state corresponding to the Ronchigram $610_2$. The arrow 614 represents the "turning" of the A1 virtual knob of the scientific instrument 100 that causes the instrument to transition from the intermediate alignment state into the target alignment state corresponding to the Ronchigram $610_0$. A tokenized sentence representing this example alignment sequence is "$X_1 X_2 X_0$," wherein $X_1$, $X_2$, and $X_0$ are the tokens corresponding to the labeled Ronchigrams $610_1$, $610_2$, and $610_0$, respectively. In the example shown, the alignment path (612, 614) is rectilinear in the parameter space and has segments oriented parallel to one of the parameter-space axes, as each segment of the alignment path represents turning of a single knob. In other examples, various ones of the alignment path segments may represent turning of a single knob or turning of two knobs at the same time. In such examples, the alignment path is still rectilinear, but its segments are not necessarily parallel to one of the parameter-space axes.

In some examples, the training text corpus built in the block 508 includes tokenized sentences of various lengths, wherein (i) each tokenized sentence ends with the token $X_0$ and (ii) any two adjacent tokens of a tokenized sentence are connected by a one-dimensional (1D) tuning operation. Herein, the term "1D tuning operation" refers to a tuning operation during which a single virtual knob of the scientific instrument 100 is turned. In the example shown in FIG. 6, each of the arrows 612 and 614 represents a respective 1D tuning operation. For the arrow 612, the corresponding 1D tuning operation includes turning the C1 virtual knob but not the A1 virtual knob. For the arrow 614, the corresponding 1D tuning operation includes turning the A1 virtual knob but not the C1 virtual knob. The path through the A1-C1 alignment parameter space represented by the arrows 612, 614 is rectilinear. In general, any two adjacent tokens of the tokenized sentence correspond to opposite ends of a respective linear segment of the rectilinear path in the parameter space. Some of the linear segments are parallel to a first (e.g., A1) dimension of the parameter space. Some other linear segments are parallel to a second (e.g., C1) dimension of the alignment parameter space. In some other examples, the AI agent is configured to implement some of the tuning steps by tuning both the A1 and C1 knobs in a 2D tuning operation.

Operations of a block 510 of the method 500 include training an autoregressive masked language model on the training text corpus built in the block 508. In an example embodiment, the training and subsequent use of the autoregressive masked language model is performed using an AI agent described in more detail below in reference to FIG. 7-8. After the training of the model is completed, the AI agent can be operated to predict and select a next alignment state of the scientific instrument 100 based on the preceding sequence of measured Ronchigrams. Incremental tuning of the scientific instrument 100 through a sequence of such next states will eventually lead to the target alignment state, e.g., corresponding to the Ronchigram $610_0$ (FIG. 6).

Figure 7:
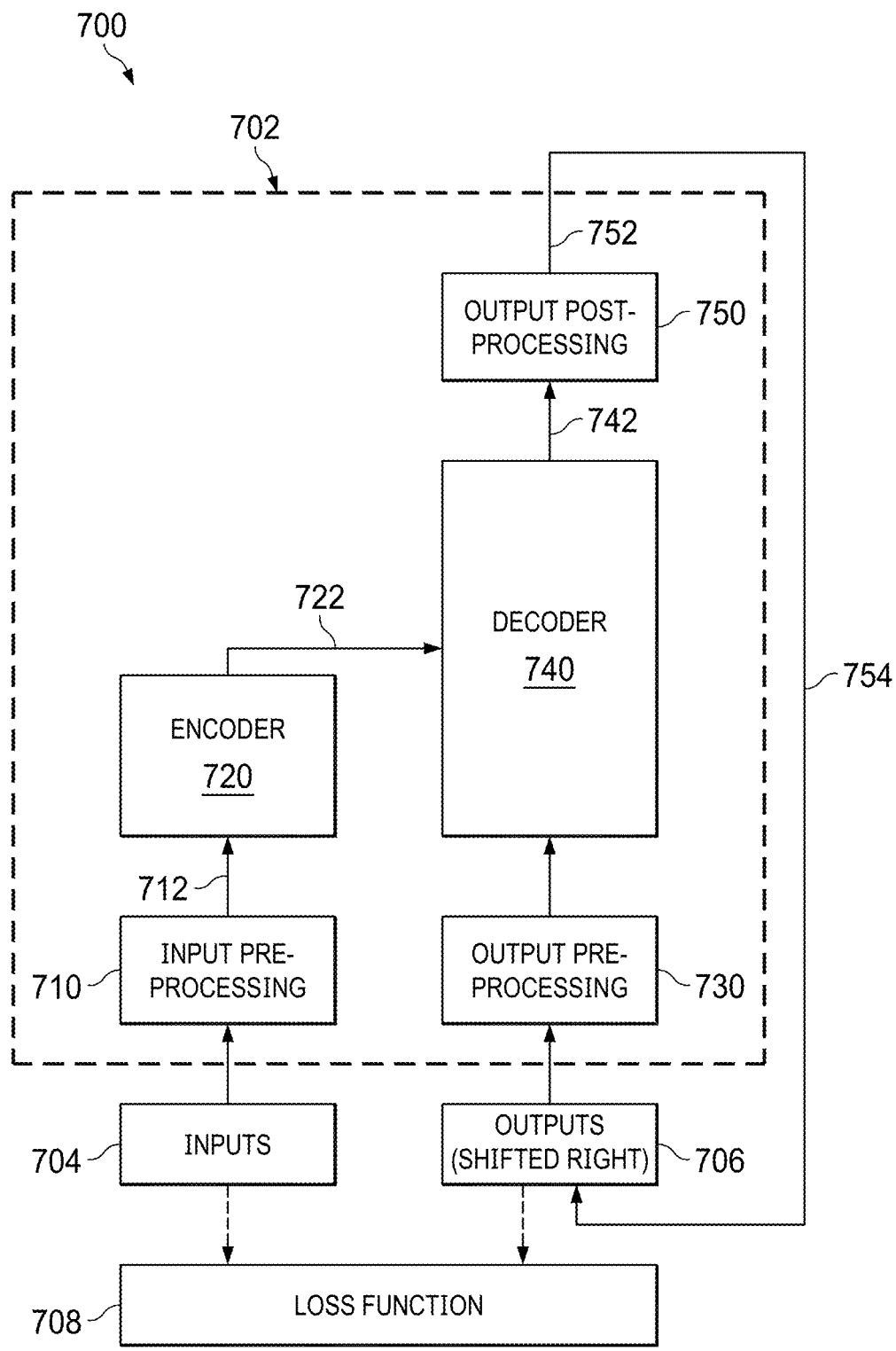
FIG. 7 is a block diagram illustrating a transformer used to perform Ronchigram alignment in the scientific instrument of FIG. 1 according to some embodiments.

FIG. 7 is a block diagram illustrating a transformer 702 used to perform Ronchigram alignment in the scientific instrument 100 according to some embodiments. In the example shown, the transformer 702 is a part of a training circuit 700 used to train the transformer 702 in accordance with the method 500. In the training circuit 700, the transformer 702 is configured to receive reference sentences 704 selected from the text corpus built in the block 508 of the method 500, e.g., as described above in reference to FIGS. 5-6. In operation, a selected reference sentence 704 is applied to an input preprocessing module 710 of the transformer 702. In one example, the input preprocessing module 710 performs embedding and positional encoding operations on the received reference sentence 704. An output 712 of the input preprocessing module 710 is a sequence of representations $(x_1, \ldots, x_n)$, which is applied to an encoder 720. The encoder operates to map the sequence 712 of representations $(x_1, \ldots, x_n)$ to a sequence 722 of representations $z = (z_1, \ldots, z_n)$. In various examples, the encoder 720 is implemented as a single encoder or a stack of encoders, with each such encoders including two respective sublayers. A first one of the two sublayers includes a respective multi-head self-attention mechanism on the input vectors. A second one of the two sublayers includes a respective position-wise fully connected feed-forward neural network. In other examples, other suitable transformer configurations can also be used.

Given z, a decoder 740 operates to generate an output vector 742 having a sequence $(y_1, \ldots, y_m)$ of symbols, one element at a time. In some examples, the decoder 740 is implemented using a stack of decoders, with each decoder of the stack including three respective sublayers. A first one of the three sublayers is a respective masked multi-head self-attention mechanism on the output vectors of the previous iteration. A second one of the three sublayers is a respective multi-head attention mechanism on the output 722 of the encoder 720 and the output of the first sublayer. A third one of the three sublayers is a respective position-wise fully connected feed-forward neural network.

The output vector 742 of the decoder 740 is applied to an output postprocessing module 750. In a representative example, the output postprocessing module 750 includes a linear layer followed by a softmax layer. The linear layer is typically implemented using a fully connected neural network that projects the output vector 742 into a larger vector often referred to as a logits vector. The softmax layer then operates to convert the logits vector into a set of probabilities (all positive values, which add up to 1). The cell having the highest probability is chosen, and the token associated with that cell is produced as an output 752 for that time step. The tokens of the output 752 are directed back, via a return loop 754, to a block 706, wherein a sequence of such tokens is generated by placing each next token 752 to the right of the corresponding previous token 752 until the <end of sentence> symbol is generated by the decoder 740. Each incomplete sentence of the block 706 is applied to an output preprocessing module 730 to initiate a next decoding iteration. The output preprocessing module 730 is functionally similar to the input preprocessing module 710 and performs embedding and positional encoding operations on the sentence 706.

After the <end of sentence> symbol is generated, the completed sentence of the block 706 is compared with the corresponding original sentence 704 in a loss function module 708. In some examples, the loss function module 708 guides the training of the transformer 702 based on cross-entropy and Kullback-Leibler divergence. When the completed output sentence 706 does not reconstruct the input sentence 704 well, the loss function module 708 imposes a corresponding penalty. The various parameters of the neural networks used in the transformer 702 are iteratively adjusted until the penalty imposed by the loss function module 708 for any of the reference sentences 704 from the text corpus built in the block 508 of the method 500 becomes smaller than a selected threshold value.

Figure 8:
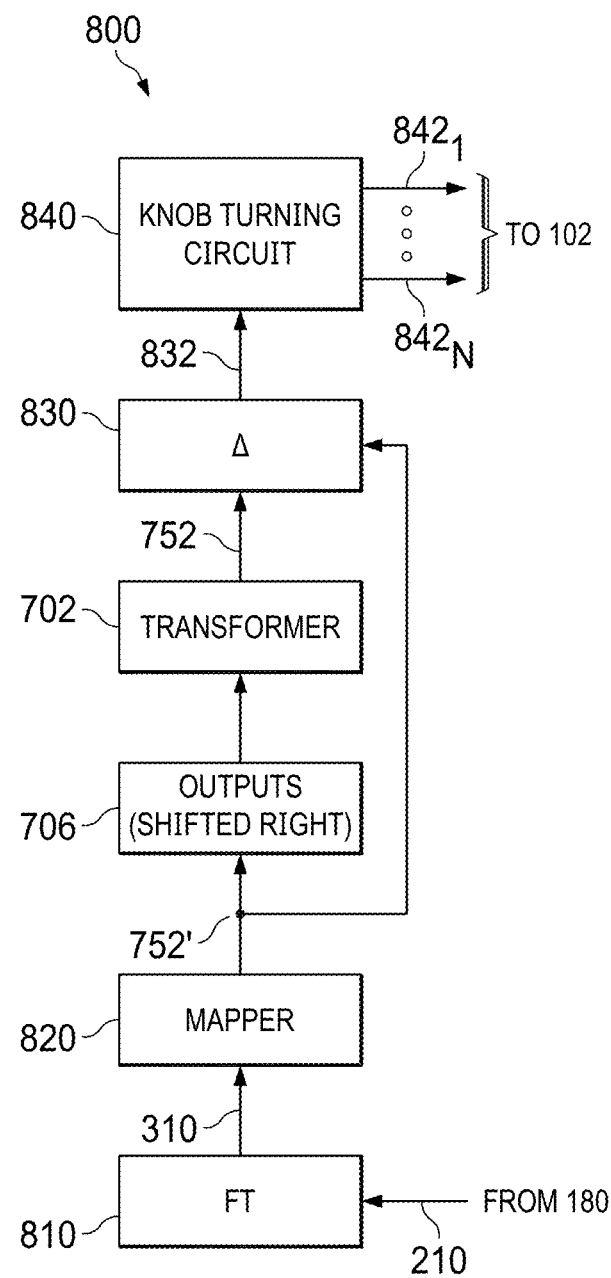
FIG. 8 is a block diagram illustrating an optics alignment circuit incorporating the transformer of FIG. 7 according to some embodiments.

FIG. 8 is a block diagram illustrating an optics alignment circuit 800 used in the electronic controller 150 of the scientific instrument 100 according to some embodiments. The optics alignment circuit 800 is configured to connect the (trained) transformer 702 to the electron-beam optics of the STEM column 102 and to the two-dimensional pixelated detector 180, e.g., as indicated in FIG. 8. Note that the optics alignment circuit 800 has various components thereof inserted into the return loop 754 (also see FIG. 7) of the transformer 702 to enable the latter to drive the Ronchigram alignment process of the scientific instrument 100, e.g., as described in more detail below.

In operation, the two-dimensional pixelated detector 180 captures the Ronchigram 210 as described above in reference to FIG. 2. The detector 180 then transmits the captured Ronchigram 210, e.g., via the stream of measurements 182, to a Fourier transform (FT) module 810 of the circuit 800. The FT module 810 applies an inverse Fourier transform to the received Ronchigram 210 to generate a corresponding reciprocal space (k-space) Ronchigram 310, which is then applied to a mapper 820. In some examples, the Fourier transform operation is omitted.

Note that the Ronchigram 310 applied to the mapper 820 belongs to a continuous space of Ronchigrams, wherein the patterns in the experimentally measured Ronchigrams 210 can generally change smoothly. However, the transformer 702 is trained, as described above, using a finite set of Ronchigrams $310_{ij}$ that discretely samples the continuous space of Ronchigrams. Hence, the mapper 820 serves to map the Ronchigrams from the continuous space of Ronchigrams onto the finite set of Ronchigrams $310_{ij}$ on which the transformer 702 has been trained via the method 500.

In one embodiment, the mapper 820 includes a variational autoencoder that operates to convert any continuous-space Ronchigram 310 into the closest corresponding finite-set Ronchigram $310_{ij}$. In some examples, the conversion process includes the following two sets of operations. During the first set of operations, the encoder portion of the variational autoencoder maps the continuous-space Ronchigram 310 onto a corresponding latent representation. During the second set of operations, the decoder portion of the variational autoencoder projects the latent representation onto a corresponding one of the reference Ronchigrams $310_{ij}$. The mapper 820 then operates to output the token 752' representing the reference Ronchigram $310_{ij}$ selected in this manner by the variational autoencoder. The outputted token 752' is entered into the block 706 as described above in reference to FIG. 7. A copy of the token 752' is also provided to a delta (Δ) circuit 830.

In some embodiments, the functions of both the FT module 810 and the mapper 820 can be implemented using a (differently trained) variational autoencoder. In such embodiments, the encoder portion of that variational autoencoder is trained to map the Ronchigram 210 onto a corresponding latent representation, with or without carrying out a Fourier transform as an explicit processing step. The decoder portion of that variational autoencoder is trained to project the latent representation onto a corresponding one of the reference Ronchigrams $310_{ij}$.

Next, the transformer 706 operates to process the present incomplete sentence 706 to output a next token 752 for that sentence, e.g., as described above in reference to FIG. 7. The delta circuit 830 then operates to process the tokens 752 and 752' to determine a parameter difference 832 between the tokens in the alignment parameter space, e.g., in the (A1, C1) alignment parameter space illustrated in FIGS. 3A-3C. In some examples corresponding to the parameter space of FIG. 3A, the parameter difference 832 has a nonzero A1 component. In some other examples corresponding to the parameter space of FIG. 3A, the parameter difference 832 has a nonzero C1 component. The determined parameter difference 832 is applied to a knob turning circuit 840 configured to convert the received parameter difference 832 into a corresponding set of one or more adjustments $842_1$-$842_N$ for the set of control signals applied by the electronic controller 150 to the electron-beam optics of the STEM column 102. In the embodiment illustrated in FIG. 1, the one or more adjustments $842_1$-$842_N$ may be used to change one or both of the control signals 152 and 156. The control-signal adjustments change the alignment state of the electron-beam optics in the STEM column 102 accordingly. The latter change will then manifest itself in the next Ronchigram 210 captured by the detector 180.

Figure 9:
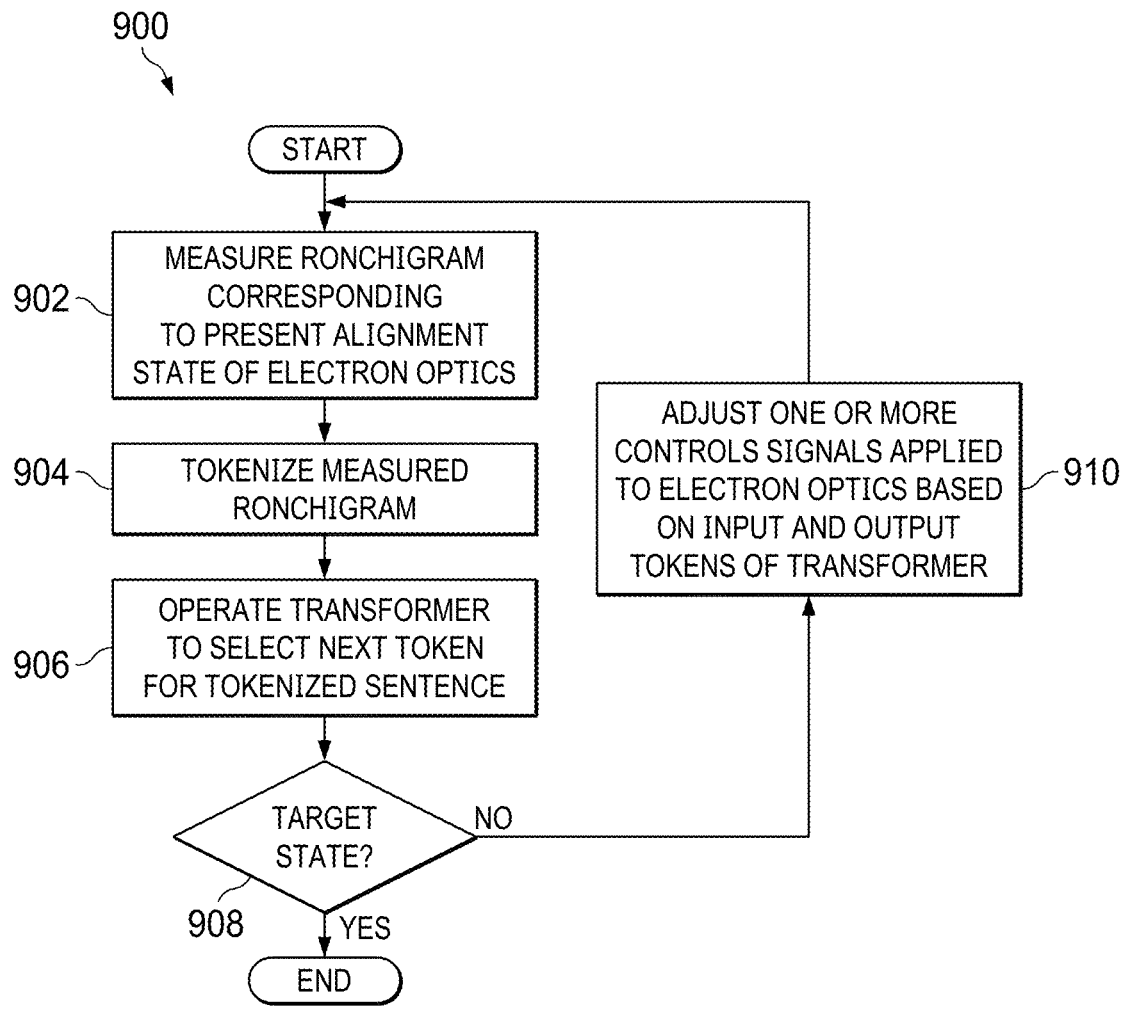
FIG. 9 is a flowchart of an automated method of aligning the electron-beam optics in the scientific instrument of FIG. 1 according to some embodiments.

FIG. 9 is a flowchart of an automated method 900 of aligning the electron-beam optics in the scientific instrument 100 according to some embodiments. In some examples, the method 900 is implemented using the optics alignment circuit 800. The method 900 is described below with continued reference to FIGS. 2 and 7-9.

Operations of a block 902 of the method 900 include operating the scientific instrument 100 to measure the Ronchigram 210 corresponding to the present alignment state of the electron-beam optics of the STEM column 102. An example of such measurements is described above, e.g., in reference to FIG. 2. Operations of a block 904 of the method 900 include converting the measured Ronchigram 210 into a corresponding token 752' from the plurality of reference tokens using which the transformer 702 has been trained. In some examples, the conversion operations of the block 904 are performed using the FT module 810 and the mapper 820 (also see FIG. 8). Operations of a block 906 of the method 900 include operating the transformer 702 to process the present incomplete sentence 706 and output a next token 752 for that sentence, e.g., as described above in reference to FIG. 7.

Operations of a decision block 908 include determining whether the target alignment state of the scientific instrument 100 is reached. In one embodiment, the target alignment state is indicated by the transformer 702 via generating the <end of sentence> symbol. When it is determined that the target alignment state is reached ("Yes," at the decision block 908), operations of the method 900 are terminated. When it is determined that the target alignment state is not reached ("No," at the decision block 908), the method 900 proceeds to perform operations of a block 910.

Operations of the block 910 include adjusting one or more control signals applied to the electron-beam optics in the STEM column 102 based on the tokens 752 and 752'. In some examples, the adjustment of the one or more controls signals is performed using the delta circuit 830 and the knob turning circuit 840 (also see FIG. 8). Upon completion of the operations of the block 910, the method 900 is looped back to the block 902.

Figure 10:
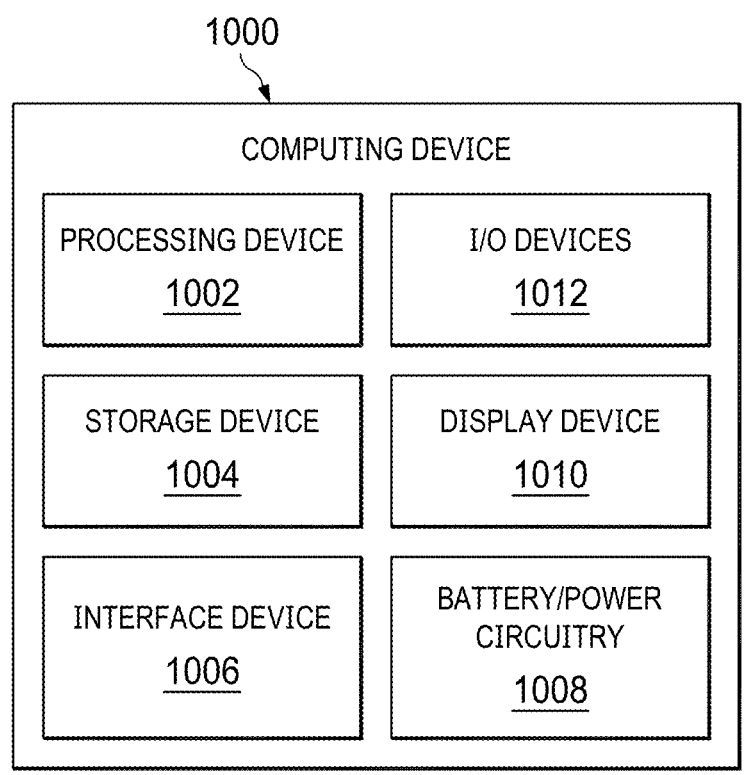
FIG. 10 is a block diagram of an example computing device configured to perform at least some scientific-instrument support operations in accordance with various embodiments.

FIG. 10 is a block diagram of an example computing device 1000 configured to perform at least some scientific-instrument support operations in accordance with various embodiments. For example, in some embodiments, the computing device 1000 performs at least some operations of the electronic controller 150 (also see FIG. 1). In various embodiments, a support module of the scientific instrument 100 may be implemented by a single computing device 1000 or by multiple computing devices 1000.

The computing device 1000 of FIG. 10 is illustrated as having a number of components, but any one or more of these components may be omitted or duplicated, as suitable for the application and setting. In some embodiments, some or all of the components included in the computing device 1000 may be attached to one or more motherboards and enclosed in a housing. In some embodiments, some of those components may be fabricated onto a single system-on-a-chip (SoC) (e.g., the SoC may include one or more processing devices 1002 and one or more storage devices 1004). Additionally, in various embodiments, the computing device 1000 may not include one or more of the components illustrated in FIG. 10, but may include interface circuitry for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 1000 may not include a display device 1010, but may include display device interface circuitry (e.g., a connector and driver circuitry) to which an external display device 1010 may be coupled.

The computing device 1000 includes a processing device 1002 (e.g., one or more processing devices). As used herein, the term "processing device" refers to any device or portion of a device that processes electronic data from registers and/or memory to transform that electronic data into other electronic data that may be stored in registers and/or memory. In various embodiments, the processing device 1002 may include one or more digital signal processors (DSPs), application-specific integrated circuits (ASICs), central processing units (CPUs), graphics processing units (GPUs), server processors, or any other suitable processing devices.

The computing device 1000 also includes a storage device 1004 (e.g., one or more storage devices). In various embodiments, the storage device 1004 may include one or more memory devices, such as random-access memory (RAM) devices (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 1004 may include memory that shares a die with the processing device 1002. In such an embodiment, the memory may be used as cache memory and include embedded dynamic random-access memory (eDRAM) or spin transfer torque magnetic random-access memory (STT-MRAM), for example. In some embodiments, the storage device 1004 may include non-transitory computer readable media having instructions thereon that, when executed by one or more processing devices (e.g., the processing device 1002), cause the computing device 1000 to perform any appropriate ones of the methods disclosed herein below or portions of such methods.

The computing device 1000 further includes an interface device 1006 (e.g., one or more interface devices 1006). In various embodiments, the interface device 1006 may include one or more communication chips, connectors, and/or other hardware and software to govern communications between the computing device 1000 and other computing devices. For example, the interface device 1006 may include circuitry for managing wireless communications for the transfer of data to and from the computing device 1000. The term "wireless" and its derivatives may be used to describe circuits, devices, systems, methods, techniques, communications channels, etc., that may communicate data via modulated electromagnetic radiation through a nonsolid medium. The term does not imply that the associated devices do not contain any wires, although in some embodiments they might not. Circuitry included in the interface device 1006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards, Long-Term Evolution (LTE) project along with any amendments, updates, and/or revisions (e.g., advanced LTE project, ultramobile broadband (UMB) project (also referred to as "3GPP2"), etc.). In some embodiments, circuitry included in the interface device 1006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 1006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 1006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 1006 may include one or more antennas (e.g., one or more antenna arrays) configured to receive and/or transmit wireless signals.

In some embodiments, the interface device 1006 may include circuitry for managing wired communications, such as electrical, optical, or any other suitable communication protocols. For example, the interface device 1006 may include circuitry to support communications in accordance with Ethernet technologies. In some embodiments, the interface device 1006 may support both wireless and wired communication, and/or may support multiple wired communication protocols and/or multiple wireless communication protocols. For example, a first set of circuitry of the interface device 1006 may be dedicated to shorter-range wireless communications such as Wi-Fi or Bluetooth, and a second set of circuitry of the interface device 1006 may be dedicated to longer-range wireless communications such as global positioning system (GPS), EDGE, GPRS, CDMA, WiMAX, LTE, EV-DO, or others. In some other embodiments, a first set of circuitry of the interface device 1006 may be dedicated to wireless communications, and a second set of circuitry of the interface device 1006 may be dedicated to wired communications.

The computing device 1000 also includes battery/power circuitry 1008. In various embodiments, the battery/power circuitry 1008 may include one or more energy storage devices (e.g., batteries or capacitors) and/or circuitry for coupling components of the computing device 1000 to an energy source separate from the computing device 1000 (e.g., to AC line power).

The computing device 1000 also includes a display device 1010 (e.g., one or multiple individual display devices). In various embodiments, the display device 1010 may include any visual indicators, such as a heads-up display, a computer monitor, a projector, a touchscreen display, a liquid crystal display (LCD), a light-emitting diode display, or a flat panel display.

The computing device 1000 also includes additional input/output (I/O) devices 1012. In various embodiments, the I/O devices 1012 may include one or more data/signal transfer interfaces, audio I/O devices (e.g., microphones or microphone arrays, speakers, headsets, earbuds, alarms, etc.), audio codecs, video codecs, printers, sensors (e.g., thermocouples or other temperature sensors, humidity sensors, pressure sensors, vibration sensors, etc.), image capture devices (e.g., one or more cameras), human interface devices (e.g., keyboards, cursor control devices, such as a mouse, a stylus, a trackball, or a touchpad), etc.

Depending on the specific embodiment of the scientific instrument 100 and/or of the instrument portion 200, various components of the interface devices 1006 and/or I/O devices 1012 can be configured to output suitable control signals (e.g., 152, 154, 156) for various components of the scientific instrument 100, receive suitable control/telemetry signals from various components of the scientific instrument 100, and receive streams of measurements (e.g., 162, 172, 182) from various detectors of the scientific instrument 100. In some examples, the interface devices 1006 and/or I/O devices 1012 include one or more analog-to-digital converters (ADCs) for transforming received analog signals into a digital form suitable for operations performed by the processing device 1002 and/or the storage device 1004. In some additional examples, the interface devices 1006 and/or I/O devices 1012 include one or more digital-to-analog converters (DACs) for transforming digital signals provided by the processing device 1002 and/or the storage device 1004 into an analog form suitable for being communicated to the corresponding components of the scientific instrument 100.

According to one example disclosed above, e.g., in the summary section and/or in reference to any one or any combination of some or all of FIGS. 1-10, provided is a support apparatus for a scientific instrument, the support apparatus comprising: an interface device configured to receive data representing Ronchigrams acquired with an electron microscope column of the scientific instrument and further configured to transmit one or more control signals for electron-beam optics of the electron microscope column; and a processing device configured to: convert a measured Ronchigram into an input token for a transformer; produce, with the transformer, an output token based on a tokenized sentence ending with the input token; and determine one or more adjustments to the one or more control signals based on the input token and the output token, wherein the input token and the output token belong to a plurality of tokens representing a plurality of reference Ronchigrams sampling an alignment parameter space of the electron-beam optics; and wherein the transformer implements an autoregressive masked language model trained on a corpus of reference sentences, each of the reference sentences representing a respective path through the alignment parameter space to a target alignment state of the electron-beam optics. As used herein, the term "Ronchigram" should be construed to encompass Ronchigram images (i.e., x-space Ronchigrams) and reciprocal space (k-space) Ronchigrams.

In some examples of the above support apparatus, the plurality of reference Ronchigrams includes one or more Ronchigrams generated via a computer model of the scientific instrument.

In some examples of any of the above support apparatus, the plurality of reference Ronchigrams includes one or more Ronchigrams acquired with the electron microscope column of the scientific instrument.

In some examples of any of the above support apparatus, the processing device is configured to iteratively update the tokenized sentence by appending thereto the input token representing the measured Ronchigram acquired after a last adjustment of the one or more control signals.

In some examples of any of the above support apparatus, different dimensions of the alignment parameter space represent different respective components of geometric aberration.

In some examples of any of the above support apparatus, each respective path is rectilinear in the alignment parameter space.

In some examples of any of the above support apparatus, any two adjacent tokens of the tokenized sentence correspond to opposite ends of a respective linear segment of the respective path through the alignment parameter space.

In some examples of any of the above support apparatus, the respective linear segment is parallel to a first dimension of the alignment parameter space representing two-fold astigmatism or is parallel to a second dimension of the alignment parameter space representing defocus.

In some examples of any of the above support apparatus, the one or more adjustments are determined based on a length of the respective linear segment in the alignment parameter space.

In some examples of any of the above support apparatus, the processing device is configured to convert the measured Ronchigram into the input token by: applying an inverse Fourier transform to the measured Ronchigram to compute a corresponding reciprocal-space Ronchigram; mapping the corresponding reciprocal-space Ronchigram to a corresponding one of the plurality of reference Ronchigrams; and providing, as the input token, a token representing the corresponding one of the plurality of reference Ronchigrams in the plurality of tokens.

In some examples of any of the above support apparatus, the transformer comprises: an encoder including a first multi-head self-attention mechanism and a first position-wise fully connected feed-forward neural network; and a decoder including a second multi-head self-attention mechanism, a multi-head attention mechanism on an output of the encoder and an output of the second multi-head self-attention mechanism, and a second fully connected feed-forward neural network.

According to another example disclosed above, e.g., in the summary section and/or in reference to any one or any combination of some or all of FIGS. 1-10, provided is an automated method performed via a computing device for providing support to a scientific instrument, the method comprising: converting a measured Ronchigram into an input token for a transformer, the measured Ronchigram being received via data acquired with an electron microscope column of the scientific instrument; producing, with the transformer, an output token based on a tokenized sentence ending with the input token; and determining, based on the input token and the output token, one or more adjustments to one or more control signals for electron-beam optics of the electron microscope column; wherein the input token and the output token belong to a plurality of tokens representing a plurality of reference Ronchigrams sampling an alignment parameter space of the electron-beam optics; and wherein the transformer implements an autoregressive masked language model trained on a corpus of reference sentences, each of the reference sentences representing a respective path through the alignment parameter space to a target alignment state of the electron-beam optics.

In some examples of the above automated method, the automated method further comprises iteratively updating the tokenized sentence by appending thereto the input token representing the measured Ronchigram acquired after a last adjustment of the one or more control signals.

In some examples of any of the above automated methods, different dimensions of the alignment parameter space represent different respective components of geometric aberration.

In some examples of any of the above automated methods, each respective path is rectilinear in the alignment parameter space.

In some examples of any of the above automated methods, any two adjacent tokens of the tokenized sentence correspond to opposite ends of a respective linear segment of the respective path through the alignment parameter space.

In some examples of any of the above automated methods, the respective linear segment is parallel to a first dimension of the alignment parameter space representing two-fold astigmatism or is parallel to a second dimension of the alignment parameter space representing defocus.

In some examples of any of the above automated methods, the one or more adjustments are determined based on a length of the respective linear segment in the alignment parameter space.

In some examples of any of the above automated methods, the converting comprises: applying an inverse Fourier transform to the measured Ronchigram to compute a corresponding reciprocal-space Ronchigram; mapping the corresponding reciprocal-space Ronchigram to a corresponding one of the plurality of reference Ronchigrams; and providing, as the input token, a token representing the corresponding one of the plurality of reference Ronchigrams in the plurality of tokens.

According to yet another example disclosed above, e.g., in the summary section and/or in reference to any one or any combination of some or all of FIGS. 1-10, provided is a non-transitory computer-readable medium storing instructions that, when executed by a computing device, cause the computing device to perform operations comprising any of the above automated methods.

It is to be understood that the above description is intended to be illustrative and not restrictive. Many implementations and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed subject matter incorporate more features than are expressly recited in each claim. Rather, as the following claims reflect, inventive subject matter lies in fewer than all features of a single disclosed example. Thus, the following claims are hereby incorporated into the Detailed Description, with each claim standing on its own as a separately claimed subject matter.

Unless explicitly stated otherwise, each numerical value and range should be interpreted as being approximate as if the word "about" or "approximately" preceded the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the terms "circuit," "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A support apparatus for a scientific instrument, the support apparatus comprising:
   an interface device configured to receive data representing Ronchigrams acquired with an electron microscope column of the scientific instrument and further configured to transmit one or more control signals for electron-beam optics of the electron microscope column; and
   a processing device configured to:
      convert a measured Ronchigram into an input token for a transformer;
      produce, with the transformer, an output token based on a tokenized sentence ending with the input token; and
      determine one or more adjustments to the one or more control signals based on the input token and the output token,
   wherein the input token and the output token belong to a plurality of tokens representing a plurality of reference Ronchigrams sampling an alignment parameter space of the electron-beam optics; and
   wherein the transformer implements an autoregressive masked language model trained on a corpus of reference sentences, each of the reference sentences representing a respective path through the alignment parameter space to a target alignment state of the electron-beam optics.

2. The support apparatus of claim 1, wherein the plurality of reference Ronchigrams includes one or more Ronchigrams generated via a computer model of the scientific instrument.

3. The support apparatus of claim 1, wherein the plurality of reference Ronchigrams includes one or more Ronchigrams acquired with the electron microscope column of the scientific instrument.

4. The support apparatus of claim 1, wherein the processing device is configured to iteratively update the tokenized sentence by appending thereto the input token representing the measured Ronchigram acquired after a last adjustment of the one or more control signals.

5. The support apparatus of claim 1, wherein different dimensions of the alignment parameter space represent different respective components of geometric aberration.

6. The support apparatus of claim 1, wherein each respective path is rectilinear in the alignment parameter space.

7. The support apparatus of claim 1, wherein any two adjacent tokens of the tokenized sentence correspond to opposite ends of a respective linear segment of the respective path through the alignment parameter space.

8. The support apparatus of claim 7, wherein the respective linear segment is parallel to a first dimension of the alignment parameter space representing two-fold astigmatism or is parallel to a second dimension of the alignment parameter space representing defocus.

9. The support apparatus of claim 8, wherein the one or more adjustments are determined based on a length of the respective linear segment in the alignment parameter space.

10. The support apparatus of claim 1, wherein the processing device is configured to convert the measured Ronchigram into the input token by:
applying an inverse Fourier transform to the measured Ronchigram to compute a corresponding reciprocal-space Ronchigram;
mapping the corresponding reciprocal-space Ronchigram to a corresponding one of the plurality of reference Ronchigrams; and
providing, as the input token, a token representing the corresponding one of the plurality of reference Ronchigrams in the plurality of tokens.

11. The support apparatus of claim 1, wherein the transformer comprises:
an encoder including a first multi-head self-attention mechanism and a first position-wise fully connected feed-forward neural network; and
a decoder including a second multi-head self-attention mechanism, a multi-head attention mechanism on an output of the encoder and an output of the second multi-head self-attention mechanism, and a second fully connected feed-forward neural network.

12. An automated method performed via a computing device for providing support to a scientific instrument, the method comprising:
converting a measured Ronchigram into an input token for a transformer, the measured Ronchigram being received via data acquired with an electron microscope column of the scientific instrument;
producing, with the transformer, an output token based on a tokenized sentence ending with the input token; and
determining, based on the input token and the output token, one or more adjustments to one or more control signals for electron-beam optics of the electron microscope column;
wherein the input token and the output token belong to a plurality of tokens representing a plurality of reference Ronchigrams sampling an alignment parameter space of the electron-beam optics; and
wherein the transformer implements an autoregressive masked language model trained on a corpus of reference sentences, each of the reference sentences representing a respective path through the alignment parameter space to a target alignment state of the electron-beam optics.

13. The automated method of claim 12, further comprising iteratively updating the tokenized sentence by appending thereto the input token representing the measured Ronchigram acquired after a last adjustment of the one or more control signals.

14. The automated method of claim 12, wherein different dimensions of the alignment parameter space represent different respective components of geometric aberration.

15. The automated method of claim 12, wherein each respective path is rectilinear in the alignment parameter space.

16. The automated method of claim 12, wherein any two adjacent tokens of the tokenized sentence correspond to opposite ends of a respective linear segment of the respective path through the alignment parameter space.

17. The automated method of claim 12, wherein the respective linear segment is parallel to a first dimension of the alignment parameter space representing two-fold astigmatism or is parallel to a second dimension of the alignment parameter space representing defocus.

18. The automated method of claim 12, wherein the one or more adjustments are determined based on a length of the respective linear segment in the alignment parameter space.

19. The automated method of claim 12, wherein the converting comprises:
applying an inverse Fourier transform to the measured Ronchigram to compute a corresponding reciprocal-space Ronchigram;
mapping the corresponding reciprocal-space Ronchigram to a corresponding one of the plurality of reference Ronchigrams; and
providing, as the input token, a token representing the corresponding one of the plurality of reference Ronchigrams in the plurality of tokens.

20. A non-transitory computer-readable medium storing instructions that, when executed by a computing device, cause the computing device to perform operations comprising the automated method of claim 12.

* * * * *